(12) United States Patent
Beschorn et al.

(10) Patent No.: US 11,130,441 B2
(45) Date of Patent: Sep. 28, 2021

(54) LIGHTING ARRANGEMENT FOR AN ATTACHMENT AND A SELF-PROPELLED HARVESTER

(71) Applicant: CLAAS Selbstfahrende Erntemaschinen GmbH, Harsewinkel (DE)

(72) Inventors: Udo Beschorn, Harsewinkel (DE); Scott Wellensiek, Harsewinkel (DE); Tamás Megyeri, Abony (HU)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 243 days.

(21) Appl. No.: 16/521,787

(22) Filed: Jul. 25, 2019

(65) Prior Publication Data
US 2020/0031270 A1 Jan. 30, 2020

(30) Foreign Application Priority Data

Jul. 27, 2018 (DE) .......................... 102018118182.5
Apr. 17, 2019 (DE) .......................... 102019110098.4

(51) Int. Cl.
*A01D 41/127* (2006.01)
*B60Q 1/04* (2006.01)
(Continued)

(52) U.S. Cl.
CPC ............. *B60Q 1/08* (2013.01); *A01D 41/127* (2013.01); *A01D 75/00* (2013.01); *B60Q 1/0483* (2013.01);
(Continued)

(58) Field of Classification Search
CPC .......... B60Q 1/08; B60Q 1/0483; B60Q 1/24; A01D 41/127; A01D 75/00; F21V 23/0442
See application file for complete search history.

(56) References Cited

U.S. PATENT DOCUMENTS 4,502,270 A    3/1985  Shupert
5,442,527 A *  8/1995  Wichelt .................. B60Q 1/14
                                                          315/83
(Continued)

FOREIGN PATENT DOCUMENTS

DE    102010028687 A1    11/2011
DE    102015206141 A1    10/2016
(Continued)

OTHER PUBLICATIONS

European Search Report for European Patent Application No. 19172881.5-1006 dated Dec. 13, 2019.

*Primary Examiner* — Arman B Fallahkhair
(74) *Attorney, Agent, or Firm* — Lempia Summerfield Katz LLC (57) ABSTRACT

An arrangement comprising an attachment and a self-propelled harvester is disclosed, with the attachment configured to harvest a crop and having a middle region for removable connection to a feeder housing of the self-propelled harvester. The attachment also includes lateral regions positioned adjacent to the middle region, with each having a bottom surface extending in a horizontal direction and a rear wall extending in a vertical direction. Lighting devices are positioned on the attachment above the respective bottom surface and below the top edge of the rear wall with light cones directed in the driving direction to illuminate a region in front of the attachment beyond the front edge of the bottom surface.

18 Claims, 6 Drawing Sheets

(51) Int. Cl.
    *F21V 23/04*          (2006.01)
    *B60Q 1/08*           (2006.01)
    *B60Q 1/24*           (2006.01)
    *A01D 75/00*         (2006.01)
    *F21Y 115/10*        (2016.01)

(52) U.S. Cl.
    CPC ............ *B60Q 1/24* (2013.01); *F21V 23/0442* (2013.01); *F21Y 2115/10* (2016.08)

(56) References Cited

U.S. PATENT DOCUMENTS

| | | | |
|---|---|---|---|
| 10,829,033 B1 * | 11/2020 | McKinney | A01D 41/14 |
| 10,834,798 B1 * | 11/2020 | Hunt | A01D 41/12 |
| 2010/0245542 A1 * | 9/2010 | Kim | G01B 11/00 |
| | | | 348/46 |
| 2017/0086374 A1 | 3/2017 | Engel | |
| 2018/0236928 A1 * | 8/2018 | Fritz | B60Q 1/18 |
| 2020/0346579 A1 * | 11/2020 | Demski | A01B 69/001 |

FOREIGN PATENT DOCUMENTS

| | | |
|---|---|---|
| EP | 3069597 A1 | 9/2016 |
| WO | WO2011032612 A1 | 3/2011 |

\* cited by examiner

LIGHTING ARRANGEMENT FOR AN ATTACHMENT AND A SELF-PROPELLED HARVESTER

CROSS REFERENCE TO RELATED APPLICATIONS

This application claims priority under 35 U.S.C. § 119 to German Patent Application No. DE 102018118182.5 (filed Jul. 27, 2018) and to German Patent Application No. DE 102019110098.4 (filed Apr. 17, 2019), the entire disclosure of both of which are hereby incorporated by reference herein.

TECHNICAL FIELD

The technical field relates to an arrangement comprising (or consisting) of an attachment and a self-propelling harvester, wherein the attachment is provided for harvesting a crop, and comprising (or consisting) of a middle region in which it is removably arranged on a feeder housing of the self-propelled harvester and has lateral regions positioned adjacent to the middle region such that each lateral region has a bottom surface extending substantially in a horizontal direction and a rear wall extending substantially in a vertical direction. The technical field moreover relates to a self-propelled harvester with an attachment for such an arrangement.

BACKGROUND

Harvesters generally have one or more work spotlights, with which the crop in front of the harvester can be illuminated in poor visibility conditions, particularly in the event of strong dust clouds or at night, in order to sufficiently light a work area in front of the self-propelled harvester. Such work spotlights are generally arranged on the cabin roof as well as a floor segment of a driver's cab, or on mirror holders.

To view the work area, WO 2011/032612, for example, discloses a seed drill with lighting means arranged on frame parts, which are used to light the soil working tools. The lighting means are arranged such that the worked soil region is illuminated, and the region above the frame is screened by frame elements. This enables the driver's view of the illuminated work region to be focused.

U.S. Pat. No. 4,502,270 discloses an attachment for a combine on which a plurality of crop dividers are arranged. So that the crop divider can still easily be guided between the rows of the crop even at twilight, the crop dividers have transparent windows behind which lighting means are arranged that: (1) light up the crop to be harvested; and (2) make the tip of the crop divider more easily discernible to the driver.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, lighting assists in harvesting. However, as working widths become increasingly large, illuminating an attachment, which may function to harvest a crop, may not be possible over the entire harvest width using lighting apparatuses positioned on the harvester. For example, if there is a large dust cloud created while harvesting, even if only temporarily, such as due to dry weather conditions or dust generated by the crop itself while harvesting, the driver's vision may be severely impaired when using the typical lighting means, such as on the harvester or the attachment, since the driver is looking at a bright wall of dust (brightened by the lighting), or the driver cannot see the lighting device(s) when the lighting device(s) are positioned on the crop dividers. Consequently, the visibility required to assess the crop flow quality of and in the attachment and/or of the crop for processing may be poor.

In one implementation, the arrangement comprises (or consists) of an attachment provided to harvest a crop (which may include one or more lighting devices distributed in different areas thereon) and a self-propelled harvester in connection with the attachment, and/or the lighting of the attachment such that it enables sufficient visibility of a region positioned in front of the attachment with the crop to be harvested in the attachment and/or on the field to be worked for the assessment of the crop flow quality (even under difficult and/or changing visibility conditions, such as in a strong dust cloud).

In one implementation, this may be achieved with an arrangement comprising (or consists of) an attachment and its self-propelled harvester wherein the attachment is configured to harvest a crop and has a region, such as a middle region, and one or more lateral regions. The middle region is the section at which the attachment is removably arranged onto or connected to a feeder housing of the self-propelled harvester. The one or more lateral regions are positioned adjacent to the middle region with one, some or each of the lateral regions having a bottom surface extending substantially in a horizontal direction and a rear wall extending substantially in a vertical direction. Further, a lighting arrangement (also known as a lighting configuration, a lighting means, or the like) may include one or more lighting devices which are positioned on the attachment above the respective bottom surface and below the top edge of the rear wall whose cone of light is directed in the driving direction of the harvester (e.g., in the direction of travel) in order to illuminate a region in front of the attachment beyond the front edge of the bottom surface.

In a specific implementation, the lighting arrangement is configured to illuminate a region in front of the attachment beyond the front edge of the bottom surface, such as below a dust zone which may form while harvesting. By positioned one or more of the lighting devices in lighting arrangement on the side of the rear wall facing the direction of travel, the forefield (e.g., the nearest path of the field) in front of the attachment is illuminated below a dust zone that can, in particular, form above the feeder housing after the middle region of the attachment. In this regard, lighting under difficult harvesting conditions, such as when the dust cloud forms above the feeder housing, is therefore significantly more flexible and less likely to create glare. Consequently, the harvester operator, located in a driver's cab positioned above the feeder housing, is spared facing an illuminated wall of dust when dust develops. The visibility of the attachment, such as its bottom surface, to evaluate the crop flow quality as well as a region in front of the attachment to evaluate the state of the crop to be collected is improved, even under difficult conditions. In harvesting situations with high dust formation, this lighting arrangement is located below the dust zone and accordingly offers fewer problems in illuminating the attachment in the region in front of the attachment.

Further, in one implementation, a self-propelled harvester is disclosed that has features for connection or arrangement to the attachment.

In one implementation, the lighting devices of the lighting arrangement may be integrated in or on the rear wall, or arranged and/or positioned on the rear wall of the respective side region of the attachment. Integrating the lighting devices of lighting arrangement in or on the rear wall of the respective side region of the attachment may be advantageous since the lighting devices of lighting arrangement may be less exposed to mechanical stress from the collected crop. In one implementation, the lighting devices of lighting arrangement may enable illumination of the attachment along at the attachment's entire width (such as beyond the attachment's entire width), which may not necessarily be possible with the lighting arranged on the harvester due to the increasing width of the attachments. In one implementation, the lighting devices of lighting arrangement of the crop flow lighting are integrated in the rear wall above the bottom surface of the attachment such that it does not restrict the crop flow. To accomplish this, an outer surface of the lighting arrangement facing the harvested crop may be smooth and/or flush with an outer surface of the rear wall along which the crop glides. The crop may therefore also glide along the lighting arrangement of the crop flow lighting without being hindered or even slowed by it.

In one implementation, the lighting devices of lighting arrangement may be arranged at a distance to the bottom surface, wherein the distance is less than 0.8 m, such as less than 0.4 m. The lighting devices of the lighting arrangement, arranged or positioned above the bottom surface, may be designed as at least one pair, such as a plurality of pairs, of the crop flow lighting type. Lighting devices of the lighting arrangement of the crop flow lighting type may illuminate below the stirred-up dust while harvesting so that the operator does not look at a white wall despite facing stirred-up dust during harvesting when the lighting device(s) of the crop flow lighting type are switched on, so that the operator may therefore be able to evaluate the crop flow quality. Moreover, the lighting devices of the lighting arrangement may light up the front edge and/or the harvested crop transported in the attachment. In order to illuminate below any arising dust, in one implementation, the lighting devices of the lighting arrangement of the crop flow lighting type may have a minimum distance to the bottom surface in the side regions of the attachment at which the harvested crop is transported to the middle region, e.g., less than 0.8 m, such as less than 0.4 m. In one implementation, lighting devices of the lighting arrangement of the crop flow lighting type is used as a manner of lighting with a beam angle less than 90°, such as in the range of 30-45°. This may prevent the operator of the harvester from being blinded by reflected light, such as, for example, from a rotating reel of an attachment designed as a grain header.

Moreover, additional lighting devices in the lighting arrangement may be positioned on the attachment on opposite ends of the side regions, wherein a sensor apparatus is configured to detect a crop edge (e.g., generate a signal indicative of detecting the crop edge) in order to align a light cone of the respective lighting device(s). In this way, alignment of the respective lighting arrangement may be accomplished using the detected crop edge. In one implementation, the additional lighting arrangement, which may be arranged or positioned on one or both of the side regions of the attachment, is only aligned using the crop edge that is detected. The illumination of the crop edge by the additional lighting arrangement on the attachment offers orientation or position assistance to the driver of a transport vehicle that accompanies the harvesting vehicle (e.g., the driver may drive essentially parallel to the crop edge).

In one implementation, at least two lighting devices in the lighting arrangement may be positioned on the attachment, with the at least two lighting devices being integrated on the side of the rear wall facing the harvester, on the rear wall, or in the rear wall, whose light cone is oriented opposite the driving direction on a region positioned or lying behind the attachment. The at least two lighting devices in the lighting arrangement may be of the stubble lighting type and may therefore light up the harvested field behind the attachment viewed in the direction of travel. Using them, the operator of the self-propelled harvester may therefore see the harvested stubble of the crop. At least two other lighting devices of the stubble lighting type may also be arranged on each outer end of the attachment.

In one implementation, the lighting devices in the lighting arrangement, positioned on the attachment, may be activated or switched on and/or switched off remotely, such as functionally activated on and/or off together, separately and/or in pairs, and/or at a central location of the attachment or the self-propelled harvester. In the implementation where the switch to activate and/or deactivate the lighting arrangement is positioned on the central location of the attachment, the central location of the attachment is not necessarily the position at which the lighting devices in the lighting arrangement are positioned. In the implementation where the switch to activate and/or deactivate the lighting arrangement is positioned on the self-propelled harvester, the central location may be positioned or resident inside or outside of a driver's cab of the self-propelled harvester.

In one implementation, the lighting devices of the lighting arrangement on the attachment may supplement the lighting generated by the work lighting positioned on the self-propelled harvester and therefore may improve the options to light the crop while harvesting. Due to the direct lighting on the attachment, the lighting path is reduced, more precise focusing on the relevant regions is possible, and the visibility of the crop is improved. Overall, the operator may better assess the harvesting process and the crop flow.

The remote control of the lighting devices on the attachment enables the activation or deactivation of the lighting devices (e.g., activating and/or deactivating via the switch) from a distant location, such as from a driver's cab of the self-propelled harvester. One, some or all of the lighting devices positioned on the attachment may therefore be activated and/or deactivated as needed by the operator of the self-propelled harvester even while harvesting, and the lighting of the harvested material is therefore flexibly adaptable to the visibility conditions, such as in the event a dust cloud is generated.

In one implementation, the lighting devices in the lighting arrangement that are positioned on the attachment may be designed as at least one pair of the same type, whose lighting arrangement are positioned on the side regions of the attachment lying opposite each other. For example, pairs or sets of lighting devices may include: pair or sets of lateral region lighting devices; pair or sets of lateral region end lighting devices; and pair or sets of lateral region rear lighting devices. As another example, pairs or sets of lighting devices may include: pairs or sets of crop edge lighting; pairs or sets of stubble lighting; or pairs or sets of crop flow lighting type. The lighting devices in the lighting arrangement of the respective pair or set may be remotely controlled, and/or may be switched on and/or off together at the central location of the attachment or the self-propelled harvester. In one implementation, the lighting arrangement of the respective pair or set may be positioned more or less symmetrically to the middle region of the attachment. This allows a symmetrical lighting field to be generated. In this regard, the lighting arrangement of the pair or set of lighting devices may be functionally remotely controllable (e.g., activated and/or deactivated) together and/or in pairs. Alternatively, or in addition, the lighting devices of the pair or set may be separately switched on and/or off, such as depending on the type of the lighting devices (e.g., the usage of the pair or set as stubble lighting, crop flow lighting, or crop edge lighting).

In one implementation, the configuration includes a switch, with the switch comprising at least two switch positions that serve to select at least two lighting modes. In this case, the switch may be connected to or positioned at the central location. The switch may be designed as a conventional electric switch and therefore may be readily available. In a specific implementation, the switch may be positioned on the attachment or on the self-propelled harvester, thereby being easily accessible to the operator. Consequently, the operator may easily activate or deactivate the selection of at least two lighting modes. In one implementation whereby the switch is on the self-propelled harvester, the switch may be positioned on an outer surface of the self-propelled harvester, such as close to the entrance into the driver's cab. In this way, the switch may be arranged in a region easily accessible to the operator.

In such a case, the lighting devices in the lighting arrangement may be operated or controlled in a first operating mode with the switch in a first switch position, in which the lighting devices in the lighting arrangement may be switched on and off individually remotely using a central control unit. The central control unit enables the activation and/or deactivation of the lighting devices in the lighting arrangement independently of each other (such as each lighting device individually, each type of lighting device together (e.g., stubble lighting, crop flow lighting, or crop edge lighting), each pair of lighting devices together (e.g., pair of lateral region lighting devices, the pair of lateral region end lighting devices, and the pair of lateral region rear lighting devices), etc.). The first switch position of the switch thus enables maximum flexibility in switching the lighting arrangement of the attachment on and off. The lighting of the crop during harvesting may therefore be configured so that it is not blinding to the operator, even in difficult visibility conditions, such as in intense dust clouds. In a specific implementation, the remote control of the lighting devices may be positioned to be within a driver's cab of the self-propelled harvester.

Moreover, the lighting devices in the lighting arrangement may be operated in a second operating mode in a second switch position in which the lighting devices in the lighting arrangement on the attachment are switched off. By switching to the second operating mode, all lighting devices in the lighting arrangement of the attachment may be switched off together in the second switch position.

Moreover, the lighting devices in the lighting arrangement may be operated in a third operating mode in a third switch position of the switch in which all of the lighting devices resident on the attachment are switched on. The ability of the operator to jointly switch on all lighting devices that are positioned on the attachment makes it easier for the operator to operate the lighting, such as, for example, during servicing, installing and or monitoring activities in the field.

In this case, the central control unit may be a control unit of the self-propelled harvester or the attachment. In a specific implementation, the central control unit is a control unit of the self-propelled harvester.

Alternatively or in addition, the central control unit is a mobile control unit, such as a smartphone, tablet or notebook equipped with corresponding control software. This makes it possible to control activation and/or deactivation of the lighting arrangement from any remote location.

In one implementation, the self-propelled harvester may have a pivotable transfer device, and the central control unit is configured to automatically temporarily deactivate the lighting arrangement depending on the positioning of the transfer device, such as when the transfer device (which may be positioned on the attachment) pivots (e.g., pivots or swivels from the side of the attachment). When discharging the harvested crop, the certain lighting devices on the attachment (e.g., lighting devices that are configured to illuminate the crop edge) are automatically deactivated responsive to the transfer device being swung out or pivoted in order not to blind the driver of a transport vehicle (e.g., the driver may be facing rearward), which may be located next to or in front of the lighting devices in the lighting arrangement that is configured to illuminate the crop edge (e.g., a sensor transmitting to the control unit a signal indicative that the transfer device has swung out results in the control unit controlling the lighting devices illuminating the stubble to turn off). After the transfer device is swung back at the conclusion of the transfer process, the lighting arrangement may be automatically reactivated (e.g., a sensor transmitting to the control unit a signal indicative that the transfer device has swung back results in the control unit controlling the lighting devices illuminating the stubble to turn back on).

In particular, the self-propelled harvester may have a driver's cab in which at least one operating unit is provided for switching on and off at least part of or all of the lighting arrangement of the attachment jointly, separately and/or in pairs. The operating unit may function together with the control unit and may enable the lighting arrangement to be activated and/or deactivate.

For this, the at least one operating unit may be designed as a switch and/or an operating panel. In this case, the cab switch and/or the operating panel may be provided to switch on and/or off at least part, or all of the lighting arrangement of the attachment. In this implementation, the cab switches as well the operating panel may be part of the operating unit for the operator of the harvester. In this case, the cab switch may be designed as a steering column switch. Conventionally, the steering column switch is used as a driving direction indicator. In the arrangement according to one implementation, the cab switch may be used an additional way to switch on and off some or all lighting arrangement of the attachment, such as for switching on and off at least the crop edge lighting.

Such an operating panel may be provided for switching on and off the lighting devices in the lighting arrangement of the self-propelled harvester, for example any one, any combination or all of: a rotating beacon arranged on the cab roof; a backup light; a rear wheel light; a high beam and other lighting means of the self-propelled harvester. In the arrangement according to one implementation, the operating panel may be configured exclusively for, or an additional way to, switching on and off some or all of the lighting devices in the lighting arrangement of the attachment, such as for switching on and off at least the lighting device(s) of the stubble lighting type, and/or the lighting device(s) that is/are positioned above the bottom surface of the attachment and that serves, inter alia, to illuminate the crop flow.

In one implementation, switching on or off one or more of the lighting devices in the attachment may depend on the switched state, such as the switched on or switched off state, of one or more lighting devices of the self-propelled harvester. In another implementation, one or more lighting devices of the attachment may be switched on or off together with one or more lighting devices of the self-propelled harvester using the cabin switch and/or the operating panel. In this case, the control unit is designed to switch on or off the one or more lighting devices positioned on the attachment and/or the one or more lighting devices positioned on the self-propelled harvester that the user has selected on the driving column switch or the operating panel.

Various lights in the lighting devices of the lighting arrangement may be connected to each other by a cable and/or wirelessly. In a specific implementation, one, some or all of the lights devices in the lighting arrangement may be linked to each other by a bus system. The linking in this case may be accomplished by using a vehicle bus, such as a CAN bus or LIN bus. In this case, the self-propelled harvester may thus use the vehicle bus for purposes of controlling the lighting devices of the lighting arrangement as well as to control other aspects of the self-propelled harvester and/or the attachment. Alternatively, or in addition, a connection or link by a remote data transmission interface such as a Bluetooth or WAN interface may also be used to control the lights of the lighting arrangement.

With an attachment designed as a so-called draper, which has at least two conveyor belts that operate in opposite directions arranged on opposite sides of the middle region to transport the harvested crop to the middle region, the distance from the lighting devices in the lighting arrangement of the crop flow lighting may preferably be less than 0.8 m to the bottom surface formed by the conveyor belts, such as less than 0.4 m.

In this case, a lighting angle and/or a focus of the lighting devices of the crop flow lighting may be configured to be automatically adjustable by the control unit sending control signals to a motor and/or may be configured for manual change of the lighting angle and/or the focus. The operator may thereby adjust the lighting cone of the lighting devices of the crop flow lighting before or even during the harvesting as needed, such as separately for each one, some, or each lighting device in the lighting arrangement. A lighting cone of a respective lighting device may be, for example, oriented toward a cutter bar on the front edge and/or the crop transported in the attachment. With an attachment designed as a cutting unit with transverse screw conveyors, reflections of the lighting device onto the auger roller, which could potential block the operator's view, may be avoided by adjusting the lighting of the lighting device or by focusing the lighting cone.

To accomplish this, one, some, or all of the lighting devices of the crop flow lighting may be separately and individually switchable. Pair-wise switching of the lights in the lighting devices of the crop flow lighting may also be performed. Moreover, the lighting angle of one, some or all of the lighting devices of the crop flow lighting may be adjustable separately and individually and/or may be adjustable in pairs.

In order to minimize the required energy, the lighting devices may comprise lights, such as an LED, or as a field of LEDs. For the crop flow lighting, a light strip may also be used, such as below or above a scraper. Alternatively, or in addition, light bulbs, headlamps, such as for crop edge lighting and/or stubble lighting, or other conventional lighting devices may be used.

In one implementation, the attachment is configured to harvest a crop. The attachment may have a middle region, whereby the attachment may be removably connected to a feeder housing of a self-propelled harvester. At least one lighting device is positioned on the attachment. The lighting device(s) in the lighting arrangement may be of any one, any combination or all of the following:
  crop edge lighting (e.g., one or more lighting devices configured to illuminate a crop edge);
  stubble lighting (e.g., one or more lighting devices configured to illuminate stubble); or
  crop flow lighting type (e.g., one or more lighting devices configured to illuminate crop flow).

One, some or all of the lighting devices in the lighting arrangement may be remotely controlled according to one implementation and/or can be activated and/or deactivated at a central location of the attachment or the self-propelled harvester. In one implementation, one, some, or all of the lighting devices in the lighting arrangement may be activated and/or deactivated at the remote location.

In one implementation, the lighting devices in the lighting arrangement may thereby supplement the lighting devices configured as work lighting and positioned on the self-propelled harvester. With the lighting devices positioned on the attachment, direct lighting is possible, thereby reducing the lighting path so that light may be more precisely focused onto relevant regions. The visibility of the crop may thereby be improved so that the operator may more readily evaluate the harvesting process as well as the crop flow. By remote switching, flexibly switching the lighting devices positioned on the attachment on and off during harvesting, for example from the driver's cab, is also contemplated.

In one implementation, the attachment is designed as a cutting unit with transverse screw conveyors and has an auger roller for transporting the harvested crop.

In another implementation, the attachment has at least one pair of light of the crop flow lighting type. The attachment in this implementation may be designed as a draper and therefore has conveyor belts for transporting the harvested crop. The conveyor belts form a bottom surface of the attachment, wherein the lighting device(s) is/are positioned above the bottom surface. In this case, a distance of the lighting devices for the crop flow lighting to a bottom surface formed by the conveyor belts may be less than 0.8 m, such as less than 0.4 m.

The crop flow lighting is therefore arranged such that it illuminates under the dust stirred up while harvesting so that the operator does not look at a white wall when the lighting device(s) of the crop flow lighting is switched on, and can evaluate the harvesting process and the crop flow despite the stirred up dust.

As discussed above, a self-propelled harvester may be used in combination with an attached. The self-propelled harvester may comprise a combine or forage harvester. The attachment may be arranged on or attached to the self-propelled harvester. To accomplish this, the self-propelled harvester has a feeder housing, whereby the attachment may be removably attached to the feeder housing via a middle region positioned in the middle of the attachment. The lighting devices may be positioned on the attachment above the respective bottom surface and below the top edge of the rear wall with light cones that are directed in the driving direction of the harvester. In one implementation, the lighting devices includes one or more lights that illuminate a region in front of the attachment beyond the front edge of the bottom surface, such as below a zone where dust clouds may form while harvesting.

In one implementation, the self-propelled harvester has a driver's cab in which a cab switch, such as a steering column switch, and/or an operating panel are provided for switching the lights in the lighting arrangement of the attachment on and off jointly, separately and/or in pairs. The lighting devices in the lighting arrangement may be switched on and off in a variety of ways, such as by controlling a switch, which may be mounted on the attachment or on the self-propelled harvester. In practice, the setting of the switch may be communicated to a control unit, which may be mounted or positioned on one or both of the attachment or the self-propelled harvester. For example, the switch may be resident in the cab, such as comprising a cab switch or as a switch on the operating panel. In this way, the lighting devices of the lighting arrangement may be flexibly switched on or off from the self-propelled harvester, such as from the driver's cab, while the self-propelled harvester is harvesting. Turning one or more of the lighting devices of the attachment on or off allows the driver to adapt the lighting while harvesting to the prevailing visibility conditions without the driver being blinded.

In one implementation, the lighting devices positioned on the attachment may supplement the lighting arranged on the self-propelled harvester, such as supplementing the lighting used while the self-propelled harvester is harvesting. Additional lighting from the lighting devices on the attachment improves illumination of the crop flow, such as in illuminating the cutting unit trough. When a strong dust cloud forms, the lighting devices on the attachment may illuminate below the dust cloud using lights positioned on the attachment so that a crop flow region in the direction of travel behind the cutting tools and/or the cutting tools themselves may be freely illuminated. Moreover, lighting devices on the attachment may comprise the crop edge lighting type, thereby allowing the crop edge of the crop to be illuminated on the field, and/or lighting devices on the attachment may comprise the stubble lighting type on the side of the attachment facing away from the crop, such as on its rear wall, thereby allowing lighting and evaluation of the stubble pattern. Finally, the remote control of the one, some or all of the lights devices positioned on the attachment allows for very flexible adaptation of the lighting from the driver's cab, even while self-propelled harvester is harvesting.

Figure 1:
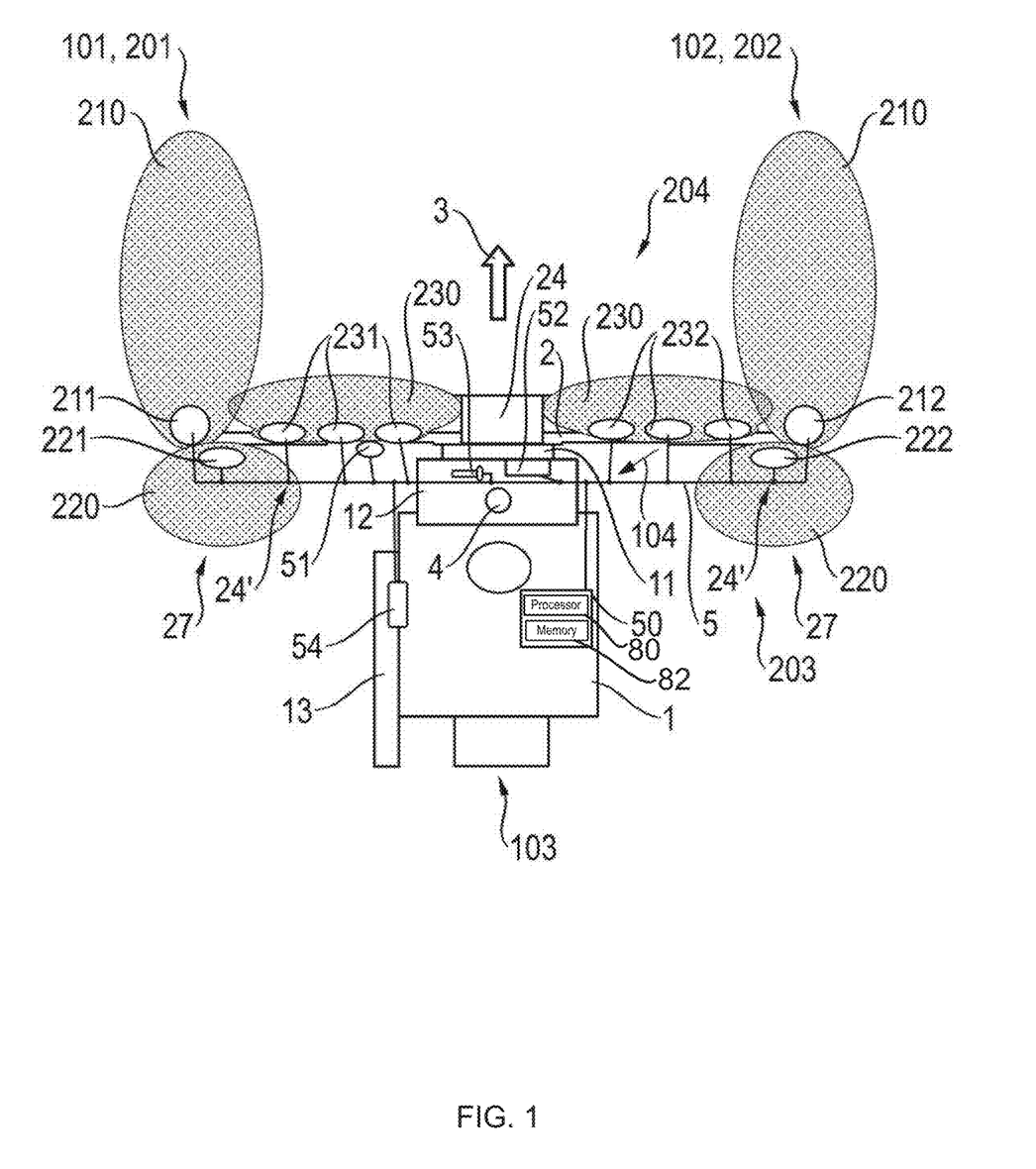
FIG. 1 illustrates an arrangement according to one implementation comprising (or consisting) of a self-propelled harvester and an attachment arranged thereupon.

Referring to the figures, FIG. 1 shows an arrangement according to one implementation comprising (or consisting of) a self-propelled harvester 1 and an attachment 2 arranged thereupon. An example of an attachment 2 (e.g., a cutting unit) is disclosed in US Patent Application Publication No. 2017/0118915 A1, incorporated by reference herein in its entirety. In one implementation, the self-propelled harvester 1 comprises a combine or forage harvester. Other self-propelled harvesters are contemplated. On a front side 104, self-propelled harvester 1 has a feeder housing 11 through which a crop is fed to downstream processing aggregates (not shown) of the self-propelled harvester 1. At a rear side 103 of the self-propelled harvester 1, non-grain components of the processed crop may be deposited on the harvested field. To discharge the grain components, the self-propelled harvester 1 has a transfer device 13 designed as a pivotable discharge pipe that is arranged on one side 101, 102, in this case on the left side 101 viewed in a direction of travel 3, of the self-propelled harvester 1.

The attachment 2 is configured to harvest a crop. To accomplish this, the attachment 2 has cutting tools 25 (see FIG. 4A) with which the crop is cut during harvesting. For example, with an attachment 2 designed as a cutting unit, the cutting tools 25 are designed as a cutter bar with oscillatingly driven cutters. The cut crop then falls onto a bottom surface 26 (see FIG. 4A) of the attachment 2 from which or by which it is then transported to a middle region 24 of the attachment 2. Arranged adjacent to the middle region 24 are side regions 24' that each have a bottom surface 26 extending substantially in a horizontal direction.

In middle region 24, the crop is conveyed such as through a passage 241 (see FIG. 4B) into the self-propelled harvester 1. To accomplish this, the attachment 2 is fastened by its middle region 24 to the feeder housing 11 of the self-propelled harvester 1.

In order to be able to drive the self-propelled harvester 1 on the road, the attachment 2 may be removed from the feeder housing 11.

On front side 104, the self-propelled harvester 1 has a driver's cab 12 in which a control unit 56 (e.g., a user interface or operating unit) is arranged that comprises input means (e.g., operating panel 52, steering column switch 53) as well as output device (not shown), and is provided to operate the self-propelled harvester 1 as well as the attachment 2. The output device may comprise a screen (e.g., a touchscreen) for the driver to interact with the self-propelled harvester 1.

A plurality of lighting devices 211, 212, 221, 222, 231, 232 are positioned on the attachment 2. Various types of lighting devices are contemplated. In this regard, any discussion regarding lighting devices may include any lighting device that is configured to generate electromagnetic radiation, such as electromagnetic radiation in the visible spectrum. A respective lighting device may include a single light and/or may include a plurality of lights. Further, one or more the lighting devices positioned on the attachment 2 may be part of a lighting arrangement. For example, the lighting arrangement may include any one, any combination, or all of: the one or more lighting devices (such as lighting devices 211, 212, 221, 222, 231, 232) positioned on the attachment 2; the structure configured to mount the one or more lighting devices onto the attachment; wiring to control the one or more lighting devices and/or wireless receivers (or the like) to wirelessly receive a command to turn on and/or off the respective one or more lighting devices. The lighting devices positioned on the attachment may comprise any one, any combination, or all of the following types: crop edge lighting devices; stubble type lighting devices; or crop flow lighting devices. As one example, the lighting devices 211, 212 of the lighting arrangement may comprise the crop edge lighting type, the lighting devices 221, 222 of the lighting arrangement may comprise the stubble lighting type, and the lighting devices 231, 232 of the lighting arrangement may comprise the crop flow lighting type. As discussed further below, lighting device(s) 231 is/are positioned to one side of the middle region 24 (e.g., a first lateral region) and may comprise first lateral region lighting device(s). Likewise, lighting device(s) 232 is/are positioned to another side of the middle region 24 (e.g., a second lateral region) and may comprise second lateral region lighting device(s). In combination, the first lateral region lighting device(s) (e.g., lighting device(s) 231) and the second lateral region lighting device(s) comprise a pair of lateral region lighting devices. The attachment 2 in this case is designed symmetrical to the middle region 24 with regard to the arrangement of the respective lighting devices 211, 212, 221, 222, 231, 232. Other designs are contemplated.

Consequently, the attachment 2 has at least one pair of lighting devices 211, 212 as crop edge lighting which is positioned on opposite outer ends 27 of the attachment 2. In this regard, lighting devices may comprise first lateral region end lighting devices (an example of which is lighting device 211) and may comprise second lateral region end lighting devices (an example of which is lighting device 212). In one implementation, the lighting devices 211, 212 of the crop edge lighting are positioned on the side of the attachment 2 facing the crop, e.g., the front side in the direction of travel 3, and is provided to light up during harvesting a forefield of the attachment 2, such as harvesting a field that has not yet been harvested. A crop edge (not shown) of the crop may be illuminated thereby. To illustrate the region lit up with this at least one pair of lighting devices 211, 212, a crop edge lighting cone 210 is shown for each of the two lighting devices 211, 212 of the crop edge lighting.

Moreover, at least one pair of lighting devices 221, 222 of the stubble lighting type are positioned on the attachment 2. The at least two lighting devices 221, 222 of the stubble lighting type are positioned on the side of the attachment 2 facing away from the crop, e.g., the rear side of the attachment 2 viewed in the direction of travel 3. Viewed in the direction of travel 3, lighting devices 221, 222 therefore light up the harvested field after the attachment 2. Each lighting device 221, 222 of the stubble lighting are positioned in this instance on one of the opposing outer ends 27 of the attachment 2 on its rear wall 29. To illustrate the region lit up with this at least one pair of lighting devices 221, 222, a stubble lighting cone 220 is shown for each of the two lighting devices 221, 222 of the stubble lighting. In this regard, one or more first lateral region rear lighting devices (which may be integrated on, positioned on, or in the rear wall the first lateral region), one example of which is lighting device 221, may be configured to generate a light beam that is oriented opposite a driving direction of the self-propelled (e.g., self-driving) harvester and on a region lying behind the attachment. Likewise, one or more second lateral region rear lighting devices (which may be integrated on, positioned on, or in the rear wall the second lateral region), one example of which is lighting device 222, may be configured to generate a light beam that is oriented opposite a driving direction of the self-propelled harvester and on a region lying behind the attachment. Further, one or more first lateral region rear lighting devices (e.g., lighting device 221) and one or more second lateral region rear lighting devices (e.g., lighting device 222) may comprise a pair of lateral region rear lighting devices.

Figure 4A:
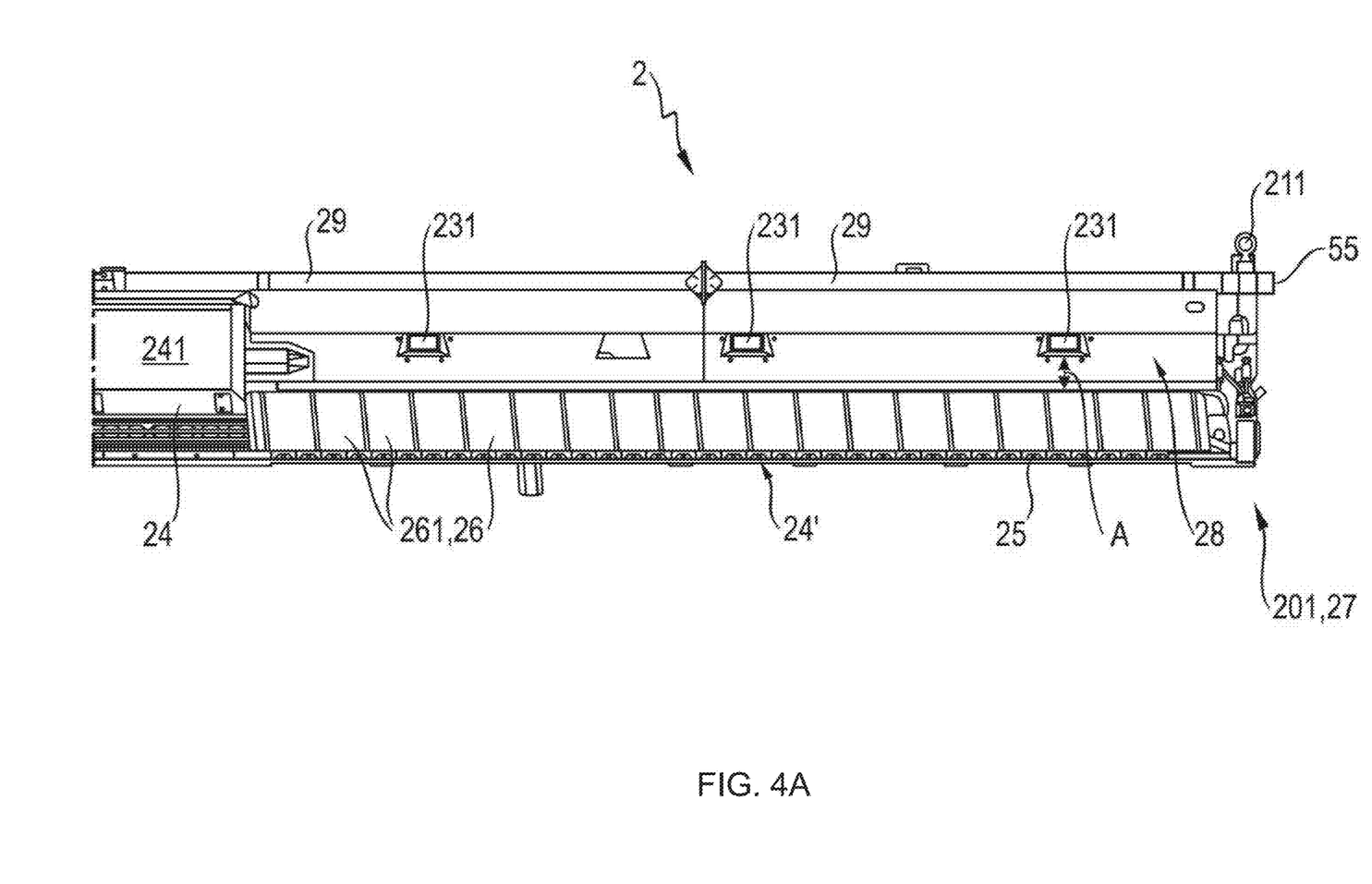
FIG. 4A illustrates a view of a section from a front side of an attachment of one arrangement.
Figure 4B:
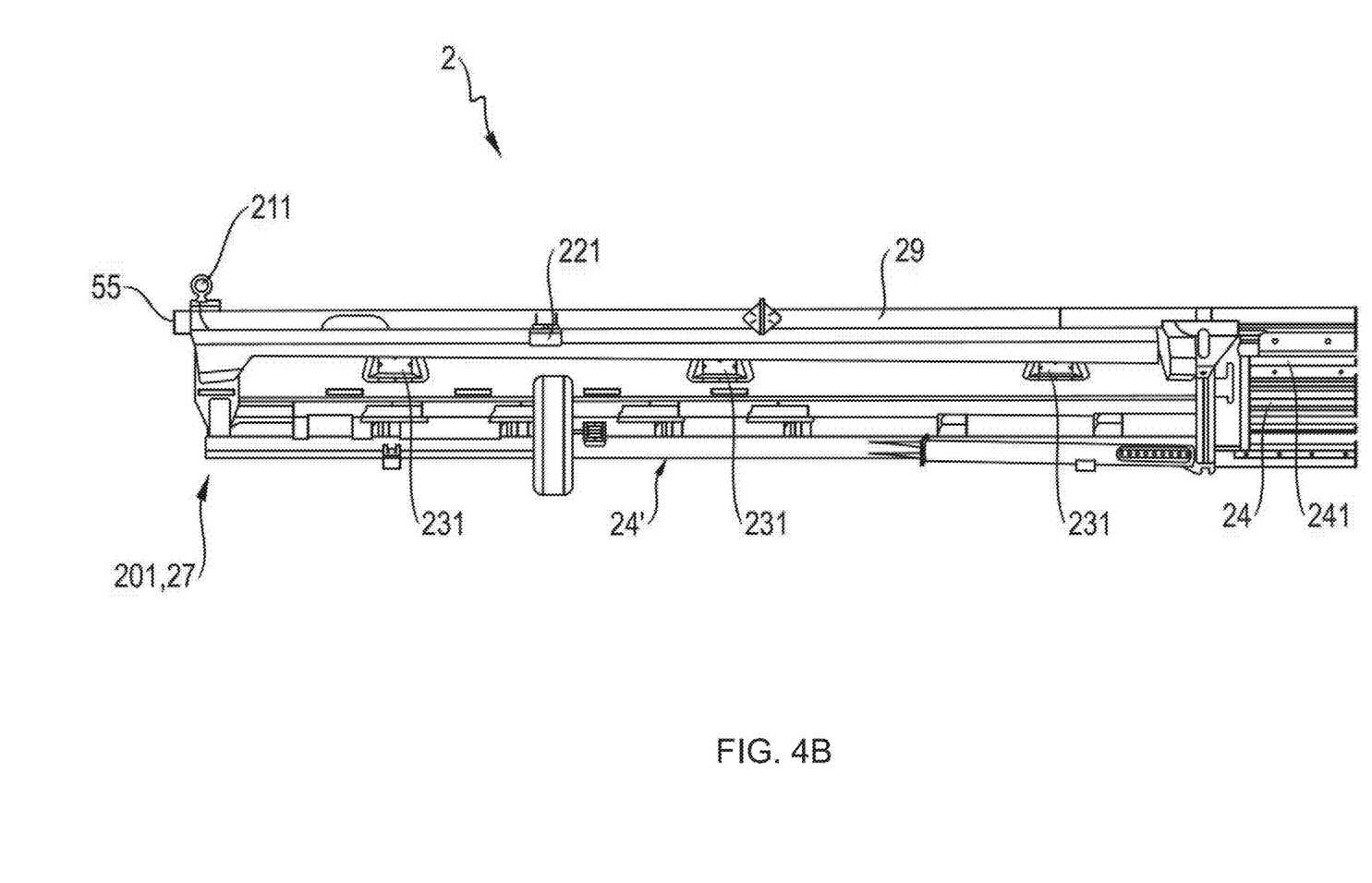
FIG. 4B illustrates a view of the section from a rear side of the attachment shown in FIG. 4A.

Moreover, the attachment 2 has a plurality, e.g., three in the illustration shown in FIG. 1 (though two, four, five or more are contemplated), of pairs of lighting devices 231, 232 of the crop flow lighting type. This type of lighting for lighting devices 231, 232 is provided to light up the crop and/or the cutting tools 25 of the attachment 2. To accomplish this, the lighting devices 231, 232 of the crop flow lighting type are arranged on the side of the attachment 2 facing the crop. In particular, the lighting devices 231, 232 are positioned distributed on a rear wall 29 (e.g., positioned so that the distance between the respective lights is equal, such as illustrated in FIG. 4A and FIG. 4B) above a cutting unit trough 28 (see FIG. 4B) along the side regions 24' of the attachment 2. In particular, the lighting devices 231, 232 may be integrated in the rear wall 29. The lighting devices 231, 232 of the crop flow lighting type may be positioned on the attachment to thereby illuminate below stirred-up dust while harvesting so that the operator 4 does not look at a white wall (despite stirred-up dust during harvesting when the light devices 231, 232 of the crop flow lighting type are switched on), so that the operator 4 may evaluate the crop flow quality. To illustrate the regions lit up with the lighting devices 231, 232, which comprise three pairs of lights, a crop flow lighting cone is shown for each of the two lighting devices 231, 232.

In one implementation, the lighting devices 211, 221, 231, 212, 222, 232 of the attachment 2 are remote controlled and/or may be switched off at a central location. In one implementation, the central location may be positioned on the attachment 2. The central location itself need not positioned on one of the lighting devices 211, 212, 221, 222, 231, 232. The central location may be formed by a switch 51 (see FIG. 2) that has at least two switch positions (e.g., a first switch position and a second switch position), which may each be assigned an operating mode. The first switch position 511 (see FIG. 2) represents a first operating mode which enables the lighting devices 211, 221, 231, 212, 222, 232 to be remotely controlled individually (e.g., controlling the lighting devices resident on the attachment individually or controlling pairs of the lighting devices (such as a pair of lateral region lighting devices together, a pair of lateral region end lighting devices together, and/or a pair of lateral region rear lighting devices together)), and the second switch position 512 (see FIG. 2) represents a second operating mode that allows all of the lighting devices resident on the attachment, such as lighting devices 211, 221, 231, 212, 222, 232, to be jointly switched off.

The switch 51 and the lighting devices 211, 221, 231, 212, 222, 232 may be networked with each other for this. As an example, a wired network 5 is illustrated. A wireless network or a combination of a wired and a wireless network is also contemplated.

The remote control may be implemented using a control unit 50 of the self-propelled harvester 1, with the control unit 50 being connected to the network 5 in order to accomplish the remote control. Alternatively, or in addition, a control unit (not shown) of the attachment 2 may be used for the remote control. In this regard, any discussion regarding a control unit 50 resident on the self-propelled harvester 1 may likewise be included on the control unit of the attachment 2. Further, the control unit of the attachment 2 may be instead of or in addition to the control unit 50 of the self-propelled harvester 1. In this case, the control unit 50 is configured to switch one or more of the lighting devices 211, 221, 231, 212, 222, 232 of the attachment 2 on or off when it receives a switching signal from any one, any combination or all of: the operator 4; a sensor 54 of the harvester; or a sensor apparatus 55 of the attachment 2. To accomplish this, in this case the self-propelled harvester 1 has the user interface in the driver's cab 12. The control unit 56 (e.g., the user interface or operating unit) may include a steering column switch 53, which may be configured as a steering column switch, as well as an operating panel 52 as input means for switching the lighting devices 211, 221, 231, 212, 222, 232 on and off. The steering column switch 53 may also be used as a driving direction indicator (e.g., a turn signal). The operating panel 52 may also be provided for switching the lighting devices (not shown) of the self-propelled harvester 1 on and off.

The lighting devices 221, 222 of the stubble lighting may also be separately switchable when the transfer device 13 of the self-propelled harvester 1 is swung out on one side 201, 202 of the self-propelled harvester 1. The swinging out of the transfer device 13 may be detected in one of several ways. In one way, the swinging out of the transfer device 13 may be detected by the sensor 54. Responsive to receiving a signal from the sensor 54 that the transfer device 13 has been swung out, the control unit 50 is then configured to turn off the lighting devices 221, 222 of the stubble lighting, which is arranged on the same side 101, 201, 102, 202 on which the transfer device 13 is swung out. The operator 4 is therefore not blinded by this lighting device 221, 222 when the transfer device 13 is swung out.

Figure 2:
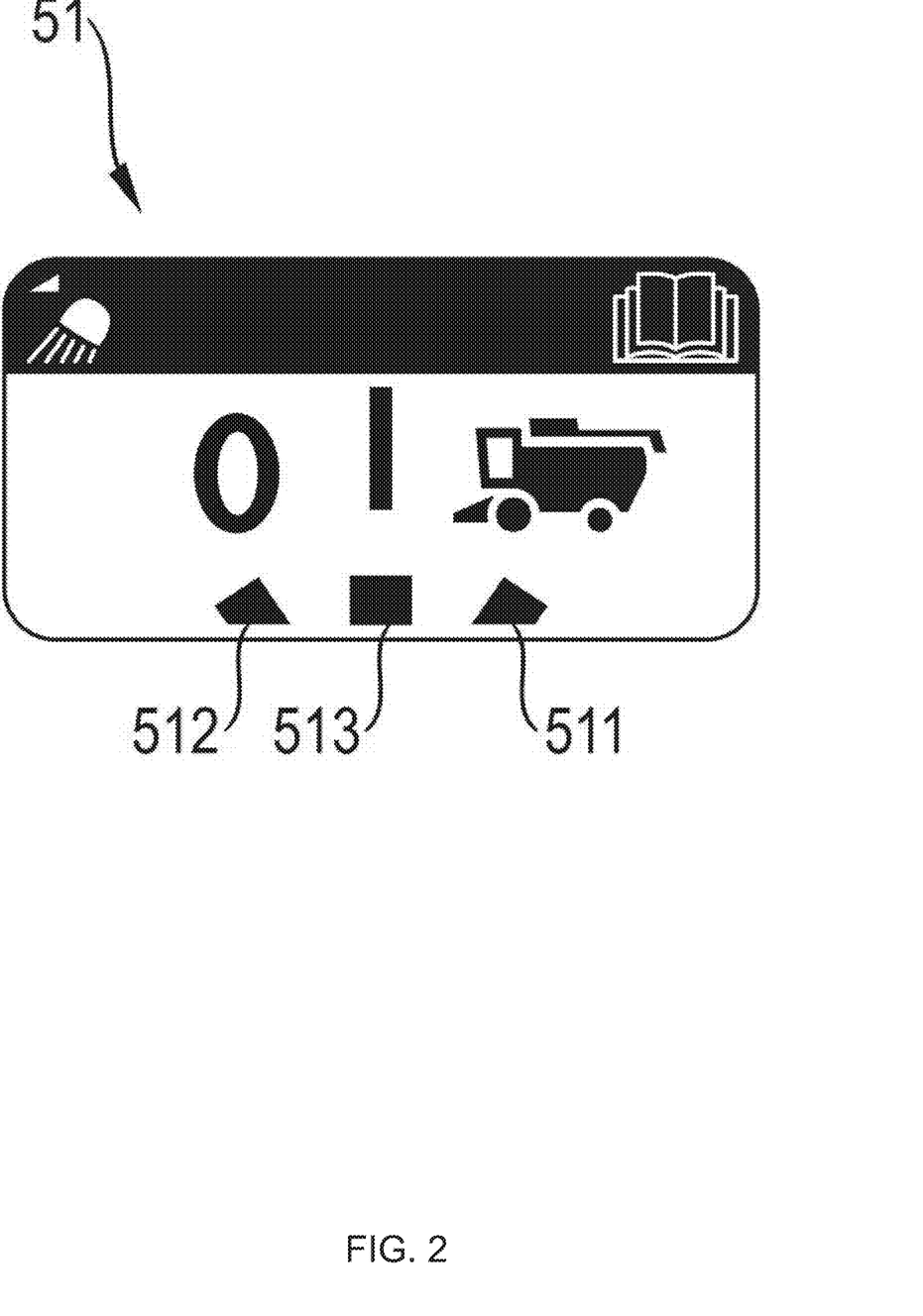
FIG. 2 illustrates a switch that, in a first switch position, enables remote control and, in a second switch position, enables switching on and/or off of lighting devices of an attachment of an arrangement according to one implementation.

FIG. 2 shows an implementation of the switch 51, which is positioned on the attachment 2. In the shown implementation, this switch 51 enables more than just the remote switching of the lighting devices 211, 221, 231, 212, 222, 232 in the first switch position 511, and the joint switching off of the lighting devices 211, 221, 231, 212, 222, 232 in the second switch position 512. Instead, this switch 51 also has a third switch position 513 which represents a third operating mode in which the switch 51 enables the joint switching on of all of the lighting devices resident on the attachment, such as lighting devices 211, 221, 231, 212, 222, 232.

Since either joint switching off, or joint switching on, or remotely switching the lighting devices 211, 221, 231, 212, 222, 232 of the attachment 2 is possible with the switch 51, it enables a preselection. This switch 51 may therefore also be termed a selector switch 51.

To the extent that the selector switch 51 is positioned on the attachment 2, it may be independent of the design of the self-propelled harvester 1. When the attachment 2 is connected to a self-propelled harvester 1 that does not allow the lighting devices 211, 221, 231, 212, 222, 232 to be remotely controlled, the selector switch 51 still allows the switching off and, depending on the design of the selector switch 51, the switching on of the lighting devices 211, 221, 231, 212, 222, 232 of the attachment 2 at the central location established by the selector switch 51. The first switch position 511 of the selector switch 51 may then merely not be used.

Figure 3A:
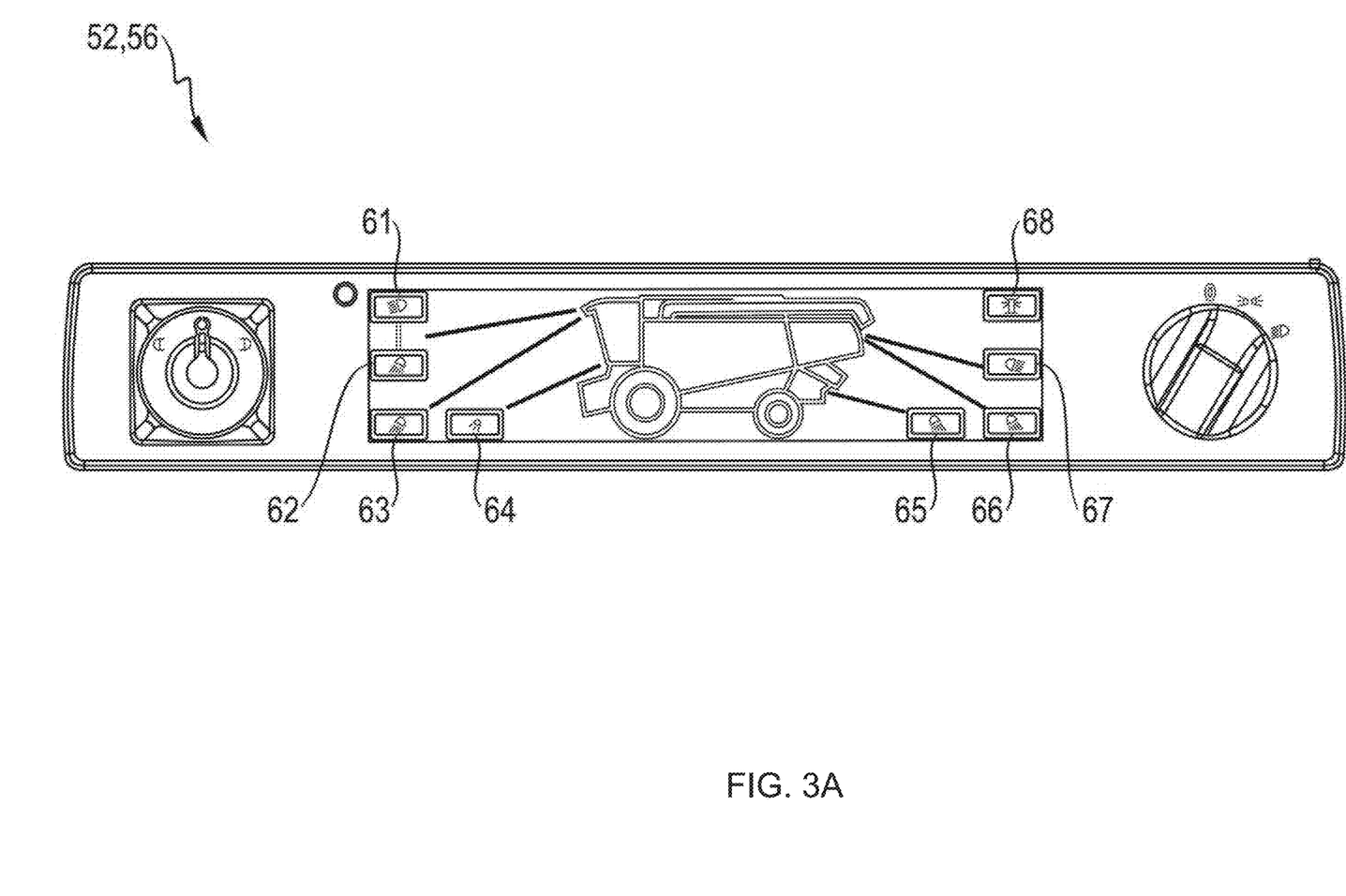
FIG. 3A illustrates a view of an operating panel arranged in a driver's cab of a self-propelled harvester in one arrangement.

FIG. 3A shows an example of an operating panel 12 positioned in the driver's cab 52. The operating panel 52 has operating keys 61-68 for switching lighting devices positioned on the self-propelled harvester 1 on and off as well as lighting devices 211, 212, 231, 232 positioned on the attachment 2. In this case, operating keys for controlling lighting devices positioned on the self-propelled harvester are included on the operating panel 52 to control a rotating beacon 68, a backup light 66, 67, rearward field lighting 65, a high beam 61, 62 and a forefield lighting 63 of the self-propelled harvester 1, as well as an operating button 64 for switching on and off the lighting devices 211, 212, 231, 232 (e.g., lighting devices positioned on the attachment 2) of the crop flow lighting, as well as the crop edge lighting of the attachment 2. The operating buttons 61-68 are designed as pushbuttons in this case and are actuated for switching on and for switching off. Other types of pushbuttons are contemplated. To detect a crop edge, the sensor apparatuses 55 are positioned on the attachment 2 on the outer ends of the side regions 24'.

Figure 3B:
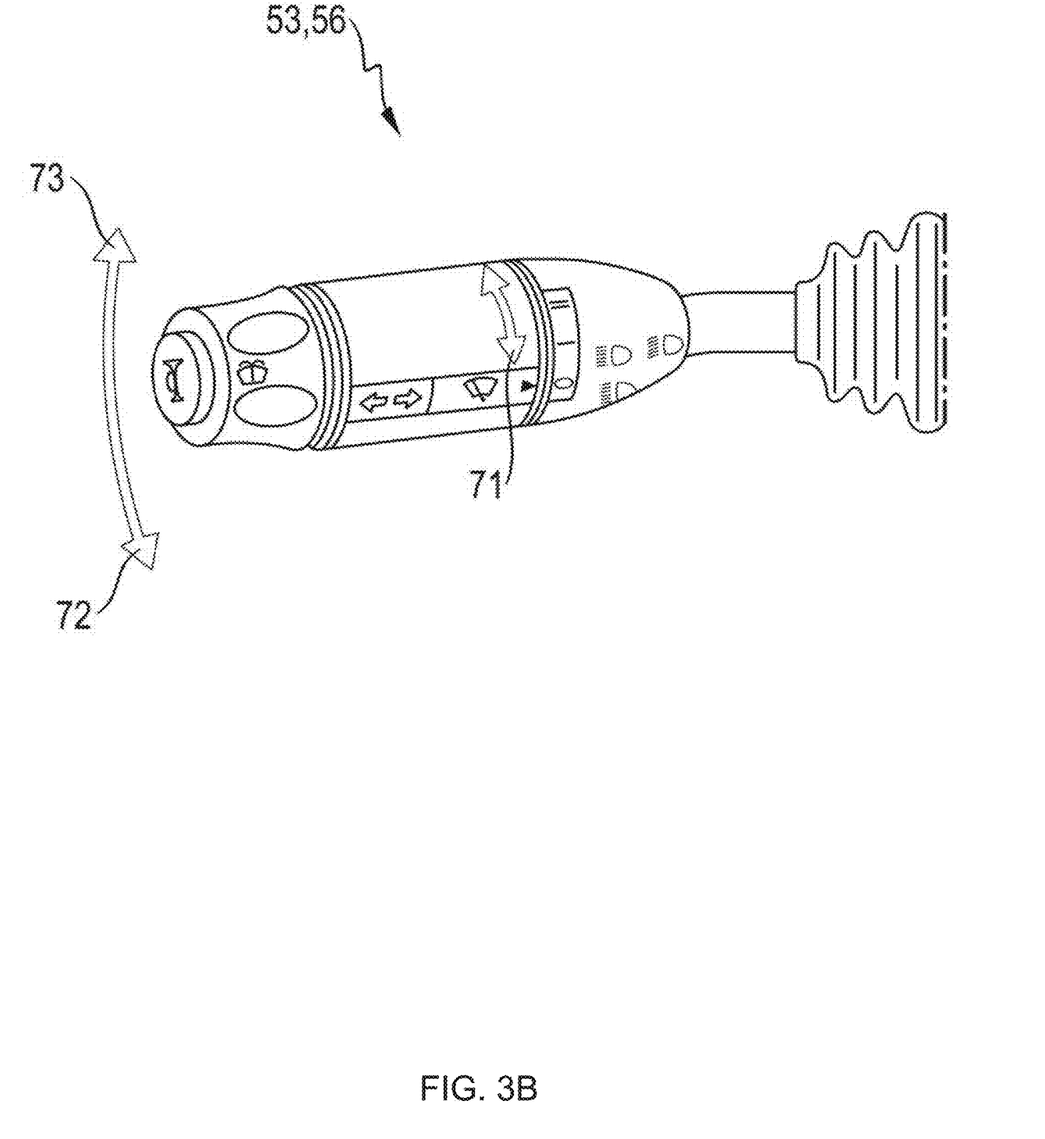
FIG. 3B illustrates a view of a cab switch positioned or resident in the driver's cab.

FIG. 3B illustrates the steering column switch 53 positioned in the driver's cab 53. By rotating a rotary switch 71 on the steering column switch 53, a windshield wiper (not shown) of a windshield (not shown) can be actuated in this case. The up and down movement 72, 73 of the steering column switch 53 actuates the turn signal of the harvester in road mode. In harvesting mode, a side lighting of the harvester and/or a crop edge lighting of the attachment are actuated thereby in addition or alternatively.

With regard to the operating panel 52 and the steering column switch 53, the operating pushbuttons 61-68 of the rotary switch 71 and/or the up and down movement 72, 73 of the steering column switch 53 can also switch other lighting devices of the attachment 2 and/or the self-propelled harvester 1. Moreover, a separate switching on and off of a lighting device 211, 221, 231, 212, 222, 232 of a pair of lighting devices 211, 221, 231, 212, 222, 232 of the attachment 2 can be provided, or a combined switching of a plurality of lighting devices of the self-propelled harvester 1 and/or the attachment 2. In addition, other switches or pushbuttons can also be provided for this on the operating panels (not shown), steering column switches (not shown) or other entry means (not shown).

FIG. 4A illustrates a section from a front side 204 of an attachment 2 of an arrangement according to one implementation and FIG. 4B illustrates a section from a rear side 203 of the attachment 2 shown in FIG. 4A.

The attachment 2 is arranged substantially symmetrically to a median plane (not shown) that cuts the middle region 24 in half. The attachment 2 is fastened in the middle region 24 to the feeder housing 11 of the self-propelled harvester 1. In the middle region 24, a passage 241 is provided through which the harvested crop is conveyed during harvesting into the feeder housing 11 of the self-propelled harvester 1. To harvest the crop, the attachment 2 has cutting tools 25, in this case in the form of a cutter bar that is arranged on the front of the attachment 2.

The attachment 2 shown here is a draper. With such an attachment 2 designed as a draper, a conveyor belt 261 is provided on each side 201, 202 of the attachment 2 to convey the crop, wherein the two conveyor belts 261 are driven in the opposite direction. The conveyor belts 261 form a bottom surface 26 in the respective side region 24' of the attachment 2 on which the crop is placed and transported. The crop is conveyed into the middle region 24 by the counter-rotating drive of the conveyor belts 261. In the middle region 24, a screw conveyor (not shown) and/or a conveyor belt (not shown) may also be arranged that transport the crop into the feeder housing 11.

The disclosure is however not restricted to an attachment 2 designed as a draper; it also relates to an attachment 2 (not shown) designed as a cutting unit with transverse screw conveyors that has screw conveyors (not shown) for transporting the crop which extend over the entire length of the respective side region 24' of the attachment and have counter-rotating helical blades on both sides of the attachment.

In order to recognize the dimensions of the attachment 2 even in bad weather conditions or at night and also be able to illuminate the crop edge (not shown), the attachment 2 has crop edge lighting. The crop edge lighting is formed here from two lighting devices 211, 212 that are arranged on opposite, outer ends 27 of the attachment 2 and are provided to illuminate the forefield of the attachment 2. The lighting devices 211, 212 may comprise a pair of lateral region end lighting devices. To control the lighting devices 211, 212, signals from the sensor apparatuses 55 (e.g., one on each respective outer end 27) are evaluated by the control unit 50. The control unit 50 may thereafter align the light cone 210 of the respective lighting devices 211, 212 based on the sensor apparatus 55 (e.g., sensor apparatus 55 (e.g., first end lateral region sensor) on end of first lateral region may be used by control unit 50 to align the light cone 210 of lighting device 211 (e.g., first lateral region end lighting device) and sensor apparatus 55 on end of second lateral region may be used by control unit 50 to align the light cone 210 of lighting device 212 (e.g., second lateral region end lighting device).

Control unit 50 may comprise any type of computing functionality and may include processor 80 and memory 82. Control unit 50 may be configured to process data and store data, respectively. Though processor 80 (which may comprise a microprocessor, controller, PLA or the like) and memory 82 are depicted as separate elements, they may be part of a single machine, which includes a microprocessor (or other type of controller) and a memory unit. The microprocessor and memory unit are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions, which may comprise computer-readable instructions, may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

As discussed herein, the implementations may be distributed. For instance, the circuitry may include multiple distinct system components, such as multiple processors and memories, and may span multiple distributed processing systems, and may be configured on multiple application levels. Any one, any combination, or all of software, parameters, databases, and other data structures may be separately stored and managed (e.g., on multiple application levels), may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry. In this regard, any discussion above regarding control unit 50 may equally be applied to control unit 56, or any other devices on the attachment 2 and/or on the self-propelled harvester 1 that necessitates computing functionality.

Due to the symmetry of the attachment 2, more or less the same amount of crop can be harvested on both sides 201, 202 of the attachment 2 and are collected on the bottom surface 26.

So that the operator 4 can observe the cutting edge of the cutting tools 25 and/or the crop flow during harvesting, the attachment 2 also has crop flow lighting which in this case is formed by three lighting devices 231, 232 arranged on the opposite sides 201, 202 of the attachment 2 in the side regions 24'. To illuminate under the dust arising while harvesting and/or due to dry weather conditions, the lighting devices 231, 232 are arranged as close as possible to the bottom surface 26 of the attachment 2 formed by the conveyor belts 261 to light up the crop flow. In this case, they are arranged on the rear wall 29 that, together with the conveyor belts 261, form a cutting unit trough. Moreover, in one implementation, the lighting devices 231, 232 have a distance A of less than 0.8 m, such as less than 0.4 m, to the conveyor belts 261.

In the shown implementation, the lighting devices 231, 232 of the crop flow lighting are designed as a LED field and can be rotated about a rotary axis (not shown) extending parallel to the rear wall 29 so that a lighting angle (not shown) is adjustable in which the cone of light 230 of the lighting devices 231, 232 contacts the conveyor belts 261 and/or the cutting tools 25. The lighting devices 231, 232 of the crop flow lighting can however also be installed in a fixed lighting angle, and/or installed flush with and in the rear wall 29.

Moreover, stubble lighting formed by lighting devices 221, 222 arranged on opposite sides of the attachment is provided. The lighting devices 221, 222 of the stubble lighting is arranged on the rear of the attachment 2, e.g., the side of the rear wall 29 facing the harvester 1. Consequently, the operator may use them to check the harvested stubble pattern.

The lighting devices 211, 212, 221, 222, 231, 232 arranged on the attachment 2 supplement the lighting device(s) positioned on the self-propelled harvester 1. When a big dust cloud appears, the crop flow on the conveyor belt 261 can be observed when the crop lighting device(s) 231, 232 is/are turned on. The lighting devices 211, 212 of the crop edge lighting also makes it possible to illuminate the crop edge of the crop on the field. Moreover, the lighting devices 221, 222 of the stubble lighting makes it possible to evaluate the stubble pattern while harvesting. The possibility of remotely turning on and off the lighting devices 211, 212, 221, 222, 231, 232 of the attachment 2, in particular from the driver's cab 12, enables flexible adaptation of the lighting to the currently predominating visibility conditions. The possibility of turning on and/or off the lighting devices 211, 212, 221, 222, 231, 232 on the attachment 2 itself also increases the comfort of the operator, in particular during servicing tasks in the field.

LIST OF REFERENCE NUMBERS

1 Self-propelled harvester, combine, forage harvester
11 Feeder housing
12 Driver's cab
13 Transfer device
101 Left side of the self-propelled harvester in the direction of travel
102 Right side of the self-propelled harvester in the direction of travel
103 Rear side
104 Front side
2 Attachment, screw attachment, draper attachment
201 Left side of the attachment
202 Right side of the attachment
203 Rear side
204 Front side
210 Crop edge lighting cone
211, 212 left/right crop edge lighting
220 Stubble lighting cone
221, 222 Left/right stubble lighting
230 Crop flow lighting cone
231, 232 Left/right crop flow lighting
24 Middle region
24' Side region
241 Passage
25 Cutting tools
26 Bottom surface
261 Conveyor belt
27 Outer end
28 Cutting unit trough
29 Rear wall
3 Direction of travel
4 Operator
5 Network
50 Control unit
51 Switch
511 First switch position, switched off position
512 Second switch position, switched on position
513 Third switch position, cab switching position
52 Operating panel
53 Steering column switch
54 Sensor
55 Sensor apparatus
56 Control unit
61, 62 High beam of the self-propelled harvester
63 Forefield lighting of the self-propelled harvester
64 Stubble lighting, crop flow lighting of the attachment
65 Rearward field lighting
66, 67 Backup light of the self-propelled harvester
68 Rotating beacon of the self-propelled harvester
71 Rotary switches
72, 73 Up and down movement
80 Processor
82 Memory
A Distance

The invention claimed is:

1. An attachment configured to harvest a crop and to attach to a self- propelled harvester, the attachment comprising:
a middle region at which the attachment is configured to be removably arranged on a feeder housing of the self-propelled harvester;
a first lateral region positioned adjacent to one side of the middle region and a second lateral region positioned adjacent to another side of the middle region, with each of the first lateral region and the second lateral region having a bottom surface extending substantially in a horizontal direction and a rear wall extending substantially in a vertical direction;
one or more first lateral region lighting devices positioned on the attachment above the bottom surface of the first lateral region and below a top edge of the rear wall of the first lateral region; and
one or more second lateral region lighting devices positioned on the attachment above the bottom surface of the second lateral region and below a top edge of the rear wall of the second lateral region,
wherein the one or more first lateral region lighting devices and the one or more second lateral region lighting devices are configured to generate light cones that are directed in a driving direction of the self-propelled harvester,
wherein the one or more first lateral region lighting devices and the one or more second lateral region lighting devices are configured to illuminate a region in front of the attachment close to the ground beyond a front edge of the bottom surface,
wherein a dust cloud is generated in a close vicinity of the attachment while the attachment is harvesting, and
wherein the region, in front of the attachment beyond the front edge of the bottom surface, illuminated by the one or more first lateral region lighting devices and the one or more second lateral region lighting devices, is below the dust cloud.

2. The attachment of claim 1, wherein the one or more first lateral region lighting devices and the one or more second lateral region lighting devices comprise a pair of lateral region lighting devices;
further comprising:
one or more first lateral region end lighting devices positioned on an end of the first lateral region;
one or more second lateral region end lighting devices positioned on an end of the second lateral region, wherein the one or more first lateral region end lighting devices and the one or more second lateral region end lighting devices comprise a pair of lateral region end lighting devices;
one or more first lateral region rear lighting devices integrated on, positioned on, or in the rear wall the first lateral region, wherein the one or more first lateral region rear lighting devices are configured to generate a light beam that is oriented opposite a driving direction of the self-propelled harvester and on a region lying behind the attachment;

one or more second lateral region rear lighting devices integrated on, positioned on, or in the rear wall the second lateral region, wherein the one or more second lateral region rear lighting devices are configured to generate a light beam that is oriented opposite the driving direction of the self-propelled harvester and on the region lying behind the attachment wherein the one or more first lateral region rear lighting devices and the one or more second lateral region rear lighting devices comprise a pair of lateral region rear lighting devices; and a switch having at least a first switch position and a second switch position, wherein the first switch position is indicative of a first operating mode enabling control of individual ones or the pair of lateral region lighting devices, the pair of lateral region end lighting devices, and the pair of lateral region rear lighting devices.

3. The attachment of claim 2, wherein the second switch position is indicative of a second operating mode enabling joint control to turn off all of the one or more first lateral region lighting devices, the one or more second lateral region lighting devices, the one or more first lateral region end lighting devices, the one or more second lateral region end lighting devices, the one or more first lateral region rear lighting devices, and the one or more second lateral region rear lighting devices.

4. The attachment of claim 3, wherein a second switch position of the switch is indicative of a third operating mode enabling joint control to turn on all of the one or more first lateral region lighting devices, the one or more second lateral region lighting devices, the one or more first lateral region end lighting devices, the one or more second lateral region end lighting devices, the one or more first lateral region rear lighting devices, and the one or more second lateral region rear lighting devices.

5. The attachment of claim 1, wherein the one or more first lateral region lighting devices are positioned on or integrated in the rear wall of the first lateral region; and wherein the one or more second lateral region lighting devices are positioned on or integrated in the rear wall of the second lateral region.

6. The attachment of claim 5, wherein the one or more first lateral region lighting devices are positioned less than 0.8 m from the bottom surface of the first lateral region; and wherein the one or more second lateral region lighting devices are positioned less than 0.8 m from the bottom surface of the second lateral region.

7. The attachment of claim 5, wherein the one or more first lateral region lighting devices are positioned less than 0.4 m from the bottom surface of the first lateral region; and wherein the one or more second lateral region lighting devices are positioned less than 0.4 m from the bottom surface of the second lateral region.

8. The attachment of claim 1, further comprising:
one or more first lateral region end lighting devices positioned on an end of the first lateral region; and
one or more second lateral region end lighting devices positioned on an end of the second lateral region.

9. The attachment of claim 8, further comprising:
a first lateral region end sensor configured to detect a crop edge;
a second lateral region end sensor configured to detect a crop edge; and
a control unit,
wherein, responsive to the first lateral region end sensor detecting the crop edge, the control unit is configured to align a light cone of the one or more first lateral region end lighting devices, and wherein, responsive to the second lateral region end sensor detecting the crop edge, the control unit is configured to align a light cone of the one or more second lateral region end lighting devices.

10. The attachment of claim 1, further comprising:
one or more first lateral region end lighting devices positioned on an end of the first lateral region;
one or more second lateral region end lighting devices positioned on an end of the second lateral region, wherein the one or more first lateral region end lighting devices and the one or more second lateral region end lighting devices comprise a pair of lateral region end lighting devices;
one or more first lateral region rear lighting devices integrated on, positioned on, or in the rear wall the first lateral region, wherein the one or more first lateral region rear lighting devices are configured to generate a light beam that is oriented opposite a driving direction of the self-propelled harvester and on a region lying behind the attachment;
one or more second lateral region rear lighting devices integrated on, positioned on, or in the rear wall the second lateral region, wherein the one or more second lateral region rear lighting devices are configured to generate a light beam that is oriented opposite the driving direction of the self-propelled harvester and on the region lying behind the attachment wherein the one or more first lateral region rear lighting devices and the one or more second lateral region rear lighting devices comprise a pair of lateral region rear lighting devices; and
a control unit,
wherein the one or more first lateral region lighting devices and the one or more second lateral region lighting devices comprise a pair of lateral region lighting devices, and
wherein the control unit is configured to control the pair of lateral region lighting devices together, the pair of lateral region end lighting devices together, and the pair of lateral region rear lighting devices together.

11. The attachment of claim 10, wherein the control unit is resident either on the attachment or on the self-propelled harvester; and
further comprising an operating panel configured to input a signal to the control unit in order for the control unit to control the pair of lateral region lighting devices together, the pair of lateral region end lighting devices together, and the pair of lateral region rear lighting devices together.

12. The attachment of claim 1, wherein the one or more first lateral region lighting devices and the one or more second lateral region lighting devices comprise a pair of lateral region lighting devices;
further comprising:
one or more first lateral region end lighting devices positioned on an end of the first lateral region;
one or more second lateral region end lighting devices positioned on an end of the second lateral region, wherein the one or more first lateral region end lighting devices and the one or more second lateral region end lighting devices comprise a pair of lateral region end lighting devices;
one or more first lateral region rear lighting devices integrated on, positioned on, or in the rear wall the first lateral region, wherein the one or more first lateral region rear lighting devices are configured to generate a light beam that is oriented opposite a driving direction of the self-propelled harvester and on a region lying behind the attachment; and one or more second lateral region rear lighting devices integrated on, positioned on, or in the rear wall the second lateral region, wherein the one or more second lateral region rear lighting devices are configured to generate a light beam that is oriented opposite the driving direction of the self-propelled harvester and on the region lying behind the attachment wherein the one or more first lateral region rear lighting devices and the one or more second lateral region rear lighting devices comprise a pair of lateral region rear lighting devices;

wherein the self-propelled harvester includes a driver's cab in which at least one operating unit is configured to control the switching on and off of the pair of lateral region lighting devices, the pair of lateral region end lighting devices, and the pair of lateral region rear lighting devices.

13. The attachment of claim 12, wherein the at least one operating unit is designed as a cab switch or an operating panel.

14. The attachment of claim 1, further comprising:
one or more first lateral region rear lighting devices integrated on, positioned on, or in the rear wall of the first lateral region, wherein the one or more first lateral region rear lighting devices are configured to generate a light beam that is oriented opposite a driving direction of the self-propelled harvester and on a region lying behind the attachment; and
one or more second lateral region rear lighting devices integrated on, positioned on, or in the rear wall of the second lateral region, wherein the one or more second lateral region rear lighting devices are configured to generate a light beam that is oriented opposite the driving direction of the self-propelled harvester and on the region lying behind the attachment.

15. The attachment of claim 1, further comprising:
one or more first lateral region end lighting devices positioned on an end of the first lateral region;
one or more second lateral region end lighting devices positioned on an end of the second lateral region;
one or more first lateral region rear lighting devices integrated on, positioned on, or in the rear wall the first lateral region, wherein the one or more first lateral region rear lighting devices are configured to generate a light beam that is oriented opposite a driving direction of the self-propelled harvester and on a region lying behind the attachment;
one or more second lateral region rear lighting devices integrated on, positioned on, or in the rear wall the second lateral region, wherein the one or more second lateral region rear lighting devices are configured to generate a light beam that is oriented opposite the driving direction of the self-propelled harvester and on the region lying behind the attachment; and
a control unit configured to individually control each of the one or more first lateral region lighting devices, the one or more second lateral region lighting devices, the one or more first lateral region end lighting devices, the one or more second lateral region end lighting devices, the one or more first lateral region rear lighting devices, and the one or more second lateral region rear lighting devices.

16. The attachment of claim 1, further comprising:
one or more first lateral region end lighting devices positioned on an end of the first lateral region;
one or more second lateral region end lighting devices positioned on an end of the second lateral region;
a pivotable transfer device configured to pivot to a side of the attachment;
a sensor configured to detect pivoting of the pivotable transfer device; and
a control unit;
wherein the control unit is configured to automatically deactivate at least one of the one or more first lateral region end lighting devices or the one or more second lateral region end lighting devices responsive to receiving a signal from the sensor indicative of detecting the pivotable transfer device pivoting side of the attachment.

17. The attachment of claim 1, further comprising:
one or more first lateral region end lighting devices positioned on an end of the first lateral region;
one or more second lateral region end lighting devices positioned on an end of the second lateral region, wherein the one or more first lateral region end lighting devices and the one or more second lateral region end lighting devices comprise a pair of lateral region end lighting devices;
one or more first lateral region rear lighting devices integrated on, positioned on, or in the rear wall the first lateral region, wherein the one or more first lateral region rear lighting devices are configured to generate a light beam that is oriented opposite a driving direction of the self-propelled harvester and on a region lying behind the attachment;
one or more second lateral region rear lighting devices integrated on, positioned on, or in the rear wall the second lateral region, wherein the one or more second lateral region rear lighting devices are configured to generate a light beam that is oriented opposite the driving direction of the self-propelled harvester and on the region lying behind the attachment wherein the one or more first lateral region rear lighting devices and the one or more second lateral region rear lighting devices comprise a pair of lateral region rear lighting devices; and
wherein the self-propelled harvester includes a driver's cab in which at least one operating unit is configured to individually control switching on and off of at least some of the one or more first lateral region lighting devices, the one or more second lateral region lighting devices, the one or more first lateral region end lighting devices, the one or more second lateral region end lighting devices, the one or more first lateral region rear lighting devices, and the one or more second lateral region rear lighting devices.

18. The attachment of claim 1, further comprising:
one or more first lateral region end lighting devices positioned on an end of the first lateral region;
one or more second lateral region end lighting devices positioned on an end of the second lateral region, wherein the one or more first lateral region end lighting devices and the one or more second lateral region end lighting devices comprise a pair of lateral region end lighting devices;
one or more first lateral region rear lighting devices integrated on, positioned on, or in the rear wall the first lateral region, wherein the one or more first lateral region rear lighting devices are configured to generate a light beam that is oriented opposite a driving direction of the self-propelled harvester and on a region lying behind the attachment;

one or more second lateral region rear lighting devices integrated on, positioned on, or in the rear wall the second lateral region, wherein the one or more second lateral region rear lighting devices are configured to generate a light beam that is oriented opposite the driving direction of the self-propelled harvester and on the region lying behind the attachment wherein the one or more first lateral region rear lighting devices and the one or more second lateral region rear lighting devices comprise a pair of lateral region rear lighting devices; and wherein the self-propelled harvester includes a driver's cab in which at least one operating unit is configured to jointly control the switching on and off of all of the one or more first lateral region lighting devices, the one or more second lateral region lighting devices, the one or more first lateral region end lighting devices, the one or more second lateral region end lighting devices, the one or more first lateral region rear lighting devices, and the one or more second lateral region rear lighting devices.

* * * * *